US008982751B2

(12) United States Patent
Morioka

(10) Patent No.: US 8,982,751 B2
(45) Date of Patent: Mar. 17, 2015

(54) WIRELESS COMMUNICATION DEVICE, WIRELESS COMMUNICATION SYSTEM, AND WIRELESS COMMUNICATION METHOD FOR DESIGNATING TRANSMISSION TIMINGS

(75) Inventor: Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 187 days.

(21) Appl. No.: 13/579,297

(22) PCT Filed: Jan. 20, 2011

(86) PCT No.: PCT/JP2011/050958
§ 371 (c)(1),
(2), (4) Date: Aug. 16, 2012

(87) PCT Pub. No.: WO2011/108301
PCT Pub. Date: Sep. 9, 2011

(65) Prior Publication Data
US 2012/0314633 A1    Dec. 13, 2012

(30) Foreign Application Priority Data

Mar. 3, 2010   (JP) ................................. 2010-046581

(51) Int. Cl.
*H04W 40/00*   (2009.01)
*H04W 74/08*   (2009.01)

(52) U.S. Cl.
CPC .................................. *H04W 74/0816* (2013.01)
USPC ........... 370/310; 370/329; 370/252; 370/328; 370/278; 375/260; 455/413; 455/525

(58) Field of Classification Search
CPC ... H04W 72/042; H04W 72/04; H04W 88/06; H04W 84/12; H04W 28/04; H04W 72/0406; H04W 88/08; H04W 84/18; H04W 28/06; H04W 48/16; H04L 5/0053; H04L 5/0007
USPC ......... 370/328, 329, 338, 352, 278, 445, 334; 455/69, 413, 525
See application file for complete search history.

(56) References Cited

U.S. PATENT DOCUMENTS 7,822,009 B2 * 10/2010 Cheng et al. .................. 370/348
7,920,497 B2 *  4/2011 Gaur .......................... 370/310.2

(Continued)

FOREIGN PATENT DOCUMENTS

JP   2006-310935   11/2006
JP   2007-208522    8/2007

(Continued)

OTHER PUBLICATIONS

U.S. Appl. No. 13/579,185, filed Aug. 15, 2012, Morioka.

(Continued)

*Primary Examiner* — Andrew Lai
*Assistant Examiner* — Mahmudul Hasan
(74) *Attorney, Agent, or Firm* — Oblon, McClelland, Maier & Neustadt, L.L.P.

(57) ABSTRACT

A wireless communication device including: a data processing unit configured to generate an RTS (Request To Send) packet including response timing information designating transmission timings of CTS (Clear To Send) packets from each of a plurality of wireless communication devices; and a transmitter unit configured to transmit the RTS packet generated by the data processing unit.

10 Claims, 11 Drawing Sheets

(56) References Cited

U.S. PATENT DOCUMENTS

| | | | |
|---|---|---|---|
| 8,274,961 B2* | 9/2012 | Sakoda et al. | 370/349 |
| 8,374,154 B2* | 2/2013 | Gong et al. | 370/334 |
| 8,432,888 B2* | 4/2013 | Sakoda et al. | 370/349 |
| 2005/0094741 A1* | 5/2005 | Kuroda | 375/267 |
| 2010/0284393 A1* | 11/2010 | Abraham et al. | 370/343 |
| 2010/0322166 A1* | 12/2010 | Sampath et al. | 370/329 |
| 2011/0280188 A1* | 11/2011 | Jeon et al. | 370/328 |
| 2013/0003661 A1* | 1/2013 | Matsuo et al. | 370/329 |

FOREIGN PATENT DOCUMENTS

| | | |
|---|---|---|
| JP | 2007-259217 | 10/2007 |
| JP | 2008-252867 | 10/2008 |
| JP | 2008-311727 | 12/2008 |

OTHER PUBLICATIONS

International Search Report issued Mar. 22, 2011 in Application No. PCT/JP2011/050958.

* cited by examiner

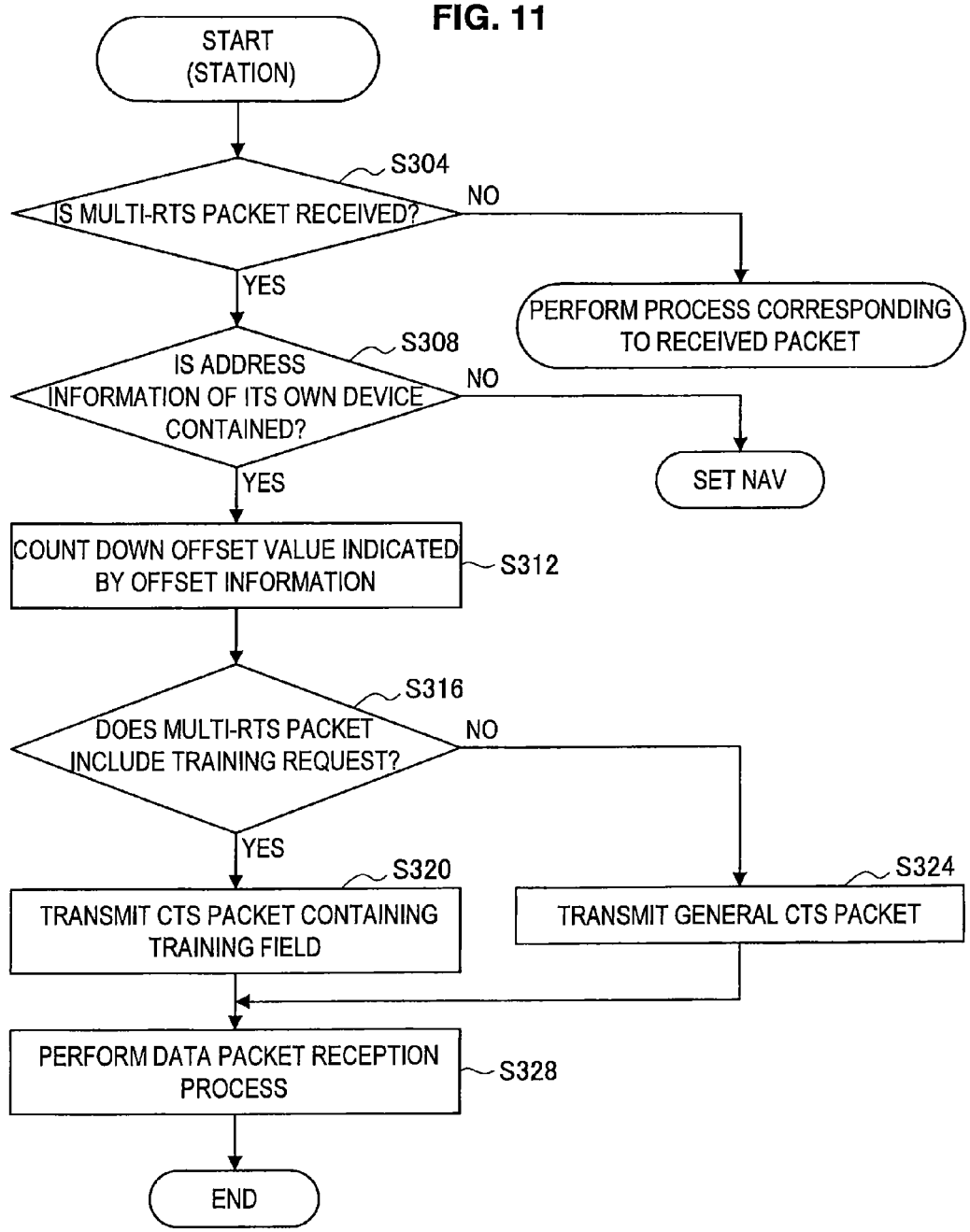

WIRELESS COMMUNICATION DEVICE, WIRELESS COMMUNICATION SYSTEM, AND WIRELESS COMMUNICATION METHOD FOR DESIGNATING TRANSMISSION TIMINGS

TECHNICAL FIELD

The present invention relates to a wireless communication device, a wireless communication system, and a wireless communication method.

BACKGROUND ART

In recent years, a wireless LAN (Local Area Network) system, which is typified by IEEE (Institute of Electrical and Electronics Engineers) 802.11, has come into wide use instead of a wired network owing to advantages of a high degree of freedom of equipment and the like. For example, IEEE 802.11a/g has come into wide use and IEEE 802.11n is expected to become widely available in the future.

Currently, IEEE 802.11ac is supposed to be employed as a next-generation wireless LAN standard. The IEEE 802.11ac is expected to employ SDMA (Space Division Multiple Access) in which wireless resources on a spatial axis are shared among a plurality of users. SDMA enables simultaneous one-to-many communications using the same frequency, which makes it possible to seek a significant improvement of the transmission rate.

A fair number of wireless LAN systems avoid interference between wireless communication devices by access control based on carrier sense, such as CSMA/CA (Carrier Sense Multiple Access with Collision Avoidance).

For example, a wireless communication device performing data transmission transmits an RTS (Request To Send) packet and initiates transmission of a data packet upon receipt of a CTS (Clear To Send) packet from a wireless communication device of a transmission destination. Further, a wireless communication device having received at least one of RTS and CTS packets which are not destined for its own station sets NAV (Network Allocation Vector) based on duration information contained in the received packet to avoid interference. The interference avoidance based on the duration information is described in, for example, the following patent literature 1.

CITATION LIST

Patent Literature

Patent Literature 1: JP 2008-252867A

SUMMARY OF INVENTION

Technical Problem

According to a simple combination of IEEE 802.11ac and RTS/CTS, a plurality of wireless communication devices simultaneously transmit CTS packets in response to an RTS packet transmitted by an access point. In this case, each of the wireless communication devices may add its unique orthogonal signal to each of the CTS packets so that the access point may detect from which wireless communication device each of the CTS packets has been transmitted.

According to IEEE 802.11, however, SIFS (Short Interframe Space), which is a packet transmission interval, has an allowable error of +−10%. On this account, transmission timings of the CTS packets by the plurality of wireless communication devices may deviate from each other by up to 20%. As a result, since the orthogonality of the orthogonal signal, which has been added to each of the CTS packets by each of the wireless communication devices, is removed, there has been a problem in that the access point may not separately detect signals transmitted from each of the wireless communication devices.

In view of the foregoing problem, the present invention is directed to a new, improved wireless communication device, wireless communication system, and wireless communication method, capable of dispersing transmission of CTS packets by a plurality of wireless communication devices in a temporal manner.

Solution to Problem

According to an aspect of the present invention in order to achieve the above-mentioned object, there is provided a wireless communication device including: a data processing unit configured to generate an RTS (Request To Send) packet including response timing information designating transmission timings of CTS (Clear To Send) packets from each of a plurality of wireless communication devices; and a transmitter unit configured to transmit the RTS packet generated by the data processing unit.

The data processing unit may set the response timing information in such a manner that transmission timings of the CTS packets from each of the plurality of wireless communication devices are different from each other.

The data processing unit may set the response timing information in such a manner that CTS packets transmitted from each of the plurality of wireless communication devices do not overlap each other on a time axis.

The wireless communication device may further include a receiver unit configured to receive a CTS packet with respect to the RTS packet. Further, the data processing unit may determine a transmission source device of the CTS packet based on a reception timing of the CTS packet by the receiver unit, and the transmitter unit may transmit a data packet to the transmission source device of the CTS packet which is determined by the data processing unit.

The transmitter unit may transmit the data packet by SDMA (Space Division Multiple Access).

According to another aspect of the present invention in order to achieve the above-mentioned object, there is provided a wireless communication device including: a receiver unit configured to receive from another wireless communication device an RTS (Request To Send) packet including response timing information designating transmission timings of CTS (Clear To Send) packets from each of a plurality of wireless communication devices; and a transmitter unit configured to transmit the CTS packet to the other wireless communication device at a transmission timing designated by the response timing information.

The CTS packet may include a training signal used for the other wireless communication device to make a channel estimation.

According to another aspect of the present invention in order to achieve the above-mentioned object, there is provided a wireless communication system including: a plurality of first wireless communication devices; and a second wireless communication device including: a data processing unit configured to generate an RTS (Request To Send) packet including response timing information designating transmission timings of CTS (Clear To Send) packets from each of the plurality of first wireless communication devices; and a transmitter unit configured to transmit the RTS packet generated by the data processing unit. Further, each of the plurality of first wireless communication devices may transmit the CTS packets to the second wireless communication device at transmission timings designated by the response timing information.

The CTS packets transmitted from each of the plurality of first wireless communication devices may be identical to each other.

According to another aspect of the present invention in order to achieve the above-mentioned object, there is provided a wireless communication method including: generating an RTS (Request To Send) packet including response timing information designating transmission timings of CTS (Clear To Send) packets from each of a plurality of wireless communication devices; and transmitting the RTS packet.

According to another aspect of the present invention in order to achieve the above-mentioned object, there is provided a wireless communication method including: receiving from another wireless communication device an RTS (Request To Send) packet including response timing information designating transmission timings of CTS (Clear To Send) packets from each of a plurality of wireless communication devices; and transmitting the CTS packet to the other wireless communication device at a transmission timing designated by the response timing information.

Advantageous Effects of Invention

According to the present invention, it is possible to disperse transmission of CTS packets by a plurality of wireless communication devices in a temporal manner.

BRIEF DESCRIPTION OF DRAWINGS

FIG. 11 is a flow chart illustrating the operation of a station according to an embodiment of the present invention.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In the present specification and drawings, a plurality of elements that have substantially the same function and structure may be denoted by the same reference sign followed by different numbers. For example, a plurality of elements that have substantially the same function and structure may be denoted by stations 20#1, 20#2 and 20#3 or branches 40-1, 40-2 and 40-N. However, if a plurality of elements that have substantially the same function and structure do not have to be differently denoted, the plurality of elements are only denoted by the same sign. For example, if the stations 20#1, 20#2 and 20#3 do not have to be differently denoted, the stations are denoted by the same reference sign, i.e., 20.

[Description of Embodiments] will be described in order of the following items:
1. Structure of Wireless Communication System
2. Structure of Wireless Communication Device
3. Method of Access Control
4. Operation of Wireless Communication Device
 (Operation of Access Point)
 (Operation of Station)
5. Conclusion

1. STRUCTURE OF WIRELESS COMMUNICATION SYSTEM

Firstly, a structure of a wireless communication system 1 according to an embodiment of the present invention will be described with reference to FIG. 1.

Figure 1:
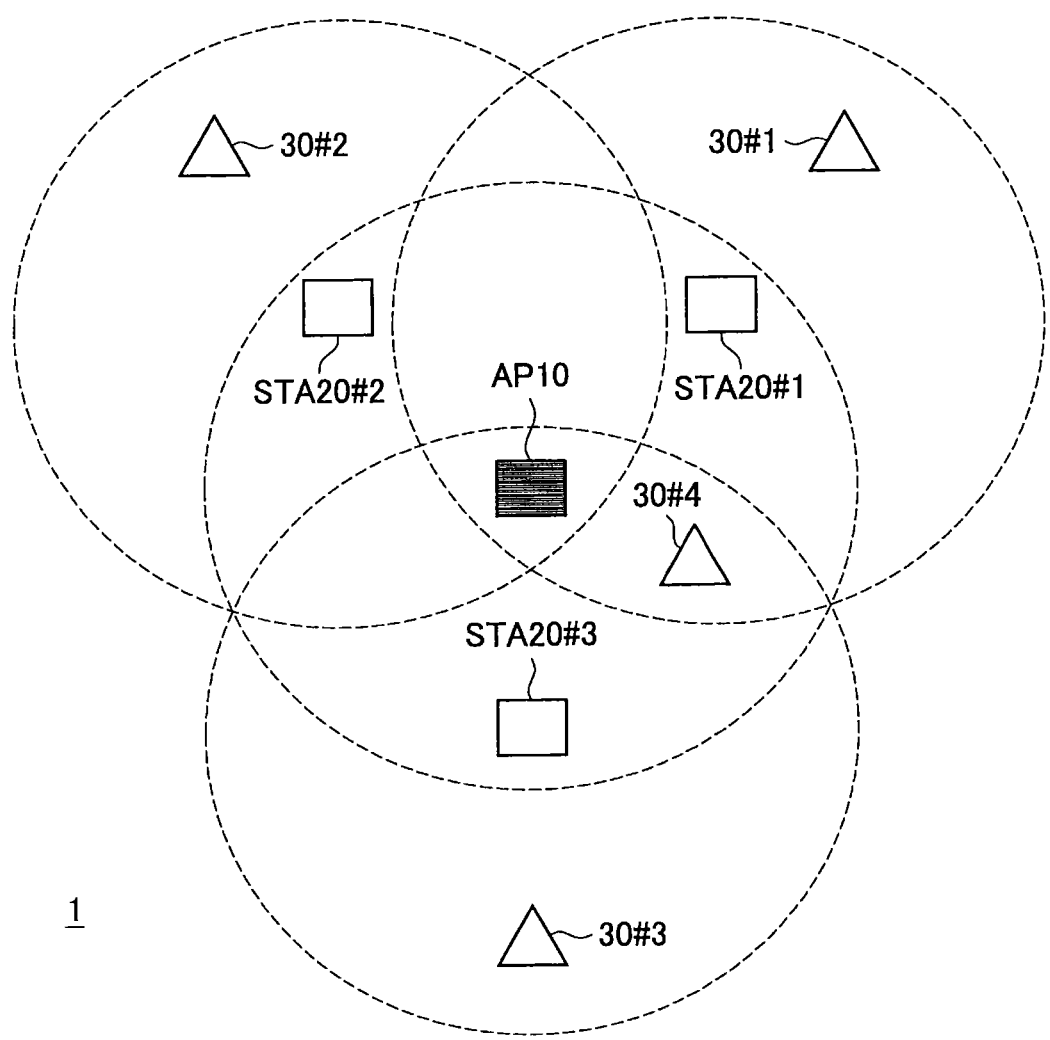
FIG. 1 is an explanatory diagram illustrating a structure of a wireless communication system according to an embodiment of the present invention.

FIG. 1 is an explanatory diagram illustrating a structure of a wireless communication system 1 according to an embodiment of the present invention. As shown in FIG. 1, the wireless communication system 1 includes an access point 10, stations 20#1~20#3, and neighboring wireless devices 30#1~30#4.

The stations 20#1~20#3 are located within communication coverage of the access point 10, while the access point 10 is located within communication coverage of the stations 20#1~20#3. On this account, the stations 20#1~20#3 may establish a direct communication with the access point 10. That is, the stations 20#1~20#3 fall within the coverage of the access point 10, and a plurality of wireless communication devices made up of the stations 20#1~20#3 and the access point 10 constitute a communication group 1 (BSS: Basic Service Set).

The access point 10 is a wireless communication device conforming to, for example, IEEE 802.11ac and performs SDMA (Space Division Multiple Access) by means of an adaptive array antenna. Specifically, the access point 10 establishes a one-to-many communication by multiplexing packets transmitted to a plurality of stations 20 with respect to the same time axis and the same frequency band or by separating packets, which are transmitted from a plurality of stations 20 through the same time axis and the same frequency band, by transmission sources. Further, the access point 10 may establish a one-to-one communication with each of the stations 20.

Like the access point 10, the station 20 is also a wireless communication device conforming to, for example, IEEE 802.11ac and performs SDMA (Space Division Multiple Access) by means of an adaptive array antenna. However, the station 20 may include fewer antennas than the access point 10 since the station 20 performs separation of packets upon receipt of the packets but does not perform multiplexing of packets to be transmitted. Some of the stations 20#1~20#3 may be a wireless communication device conforming to a traditional standard, such as IEEE 802.11a/g.

It may be determined upon manufacturing a wireless communication device or by negotiation upon processing a connection of a wireless communication device whether the wireless communication device will operate as the access point 20 (Group Owner) or the station 10 (Client).

The wireless communication device, such as the access point 10 and the station 20, is not limited to any specific hardware type. For example, the wireless communication device, such as the access point 10 and the station 20, may be an information processing device, such as a PC (Personal Computer), a household image processing device (e.g., a DVD recorder, a video deck, or the like), a PDA (Personal Digital Assistant), a household game machine, or a household appliance. Further, the wireless communication device, such as the access point 10 and the station 20, may be an information processing device, such as a mobile phone, a PHS (Personal Handyphone System), a portable music player, a portable image processing device, or a portable game machine.

For the wireless communication system 1, RTS/CTS handshake may be used to prevent interference between communication by the access point 10 and the station 20 and communication by the neighboring wireless devices 30#1~30#4. However, a simple application of the RTS/CTS handshake to the wireless communication system 1 may cause the following problems which will be described with reference to FIGS. 2 and 3.

Figure 2:
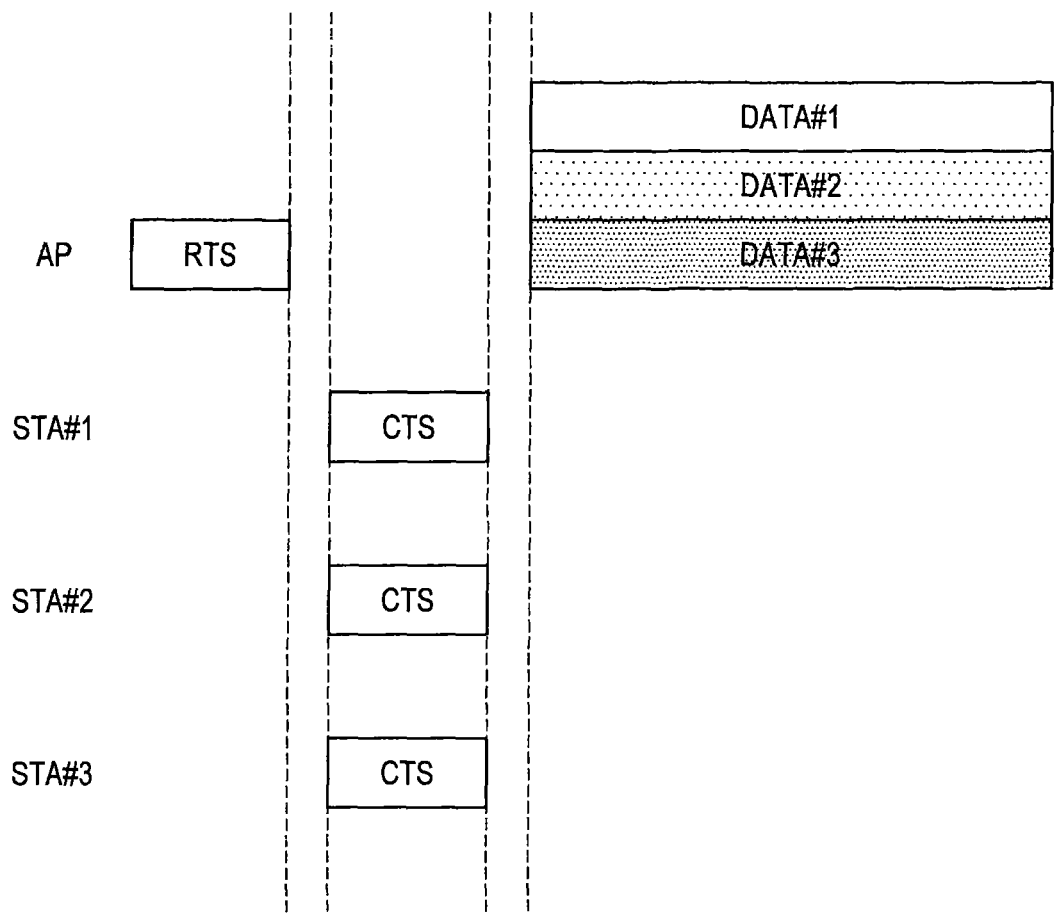
FIG. 2 is an explanatory diagram illustrating RTS/CTS handshake in a wireless communication system according to a comparative example.
Figure 3:
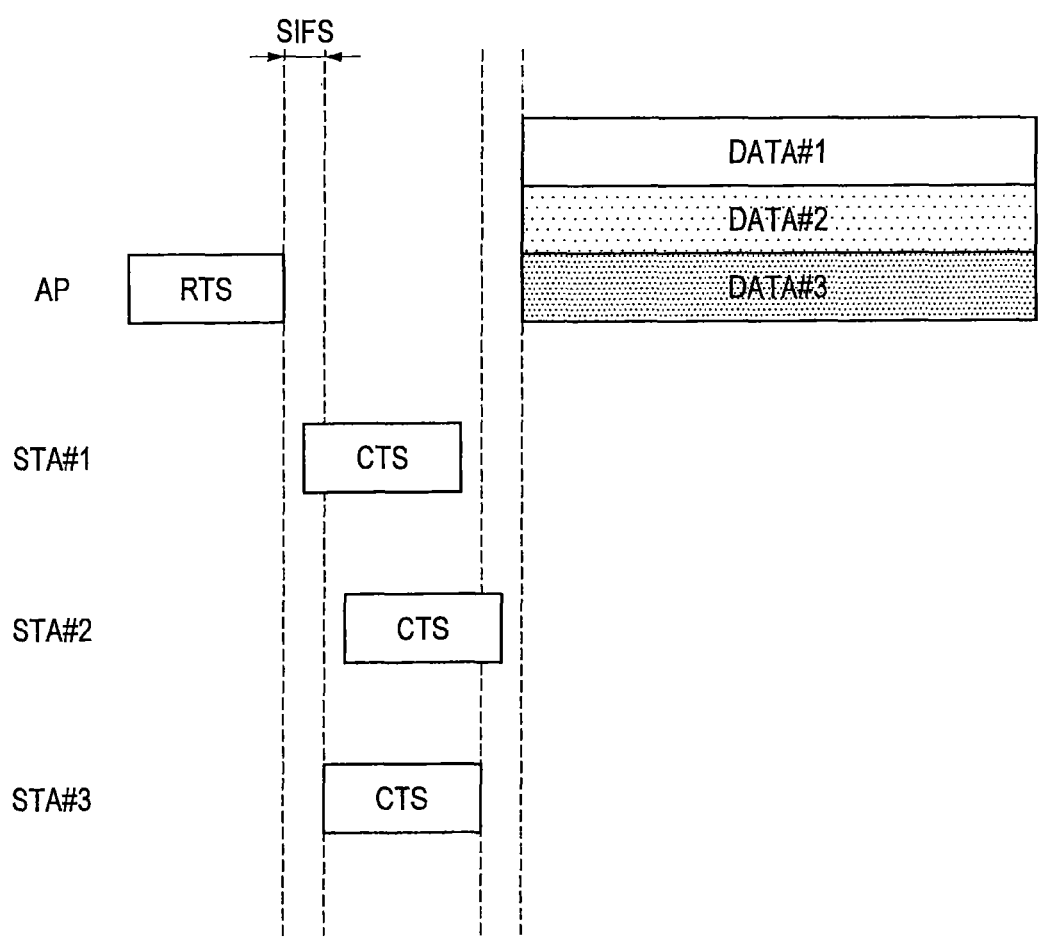
FIG. 3 is an explanatory diagram illustrating RTS/CTS handshake in a wireless communication system according to a comparative example.

FIGS. 2 and 3 are explanatory diagrams illustrating RTS/CTS handshake in a wireless communication system according to comparative examples. As shown in FIG. 2, for the wireless communication system according to a comparative example, the stations #1~#3 transmit CTS packets almost at the same time according to the same reference (SIFS) with respect to an RTS packet transmitted by the access point. In this case, each of the stations transmits a CTS packet with its unique orthogonal signal added so that the access point may detect from which station each CTS packet has been transmitted.

According to IEEE 802.11, however, SIFS, i.e., a packet transmission interval, has an allowable error of +−10%. On this account, as shown in FIG. 3, the transmission timings of the CTS packets by the stations #1~#3 may deviate from each other by up to 20%. Consequently, since the orthogonality of the orthogonal signal which is added to each of the CTS packets by each of the stations may be removed, the access point may not separately detect signals transmitted from each of the stations in the wireless communication system according to the comparative example.

In view of the foregoing situation, embodiments of the present invention have been conceived. According to the embodiments of the present invention, the access point may easily detect a transmission source station of each of the CTS packets by dispersing transmission of the CTS packets by a plurality of stations 20 in a temporal manner. The embodiments of the present invention will be described in detail.

2. STRUCTURE OF WIRELESS COMMUNICATION DEVICE

Figure 4:
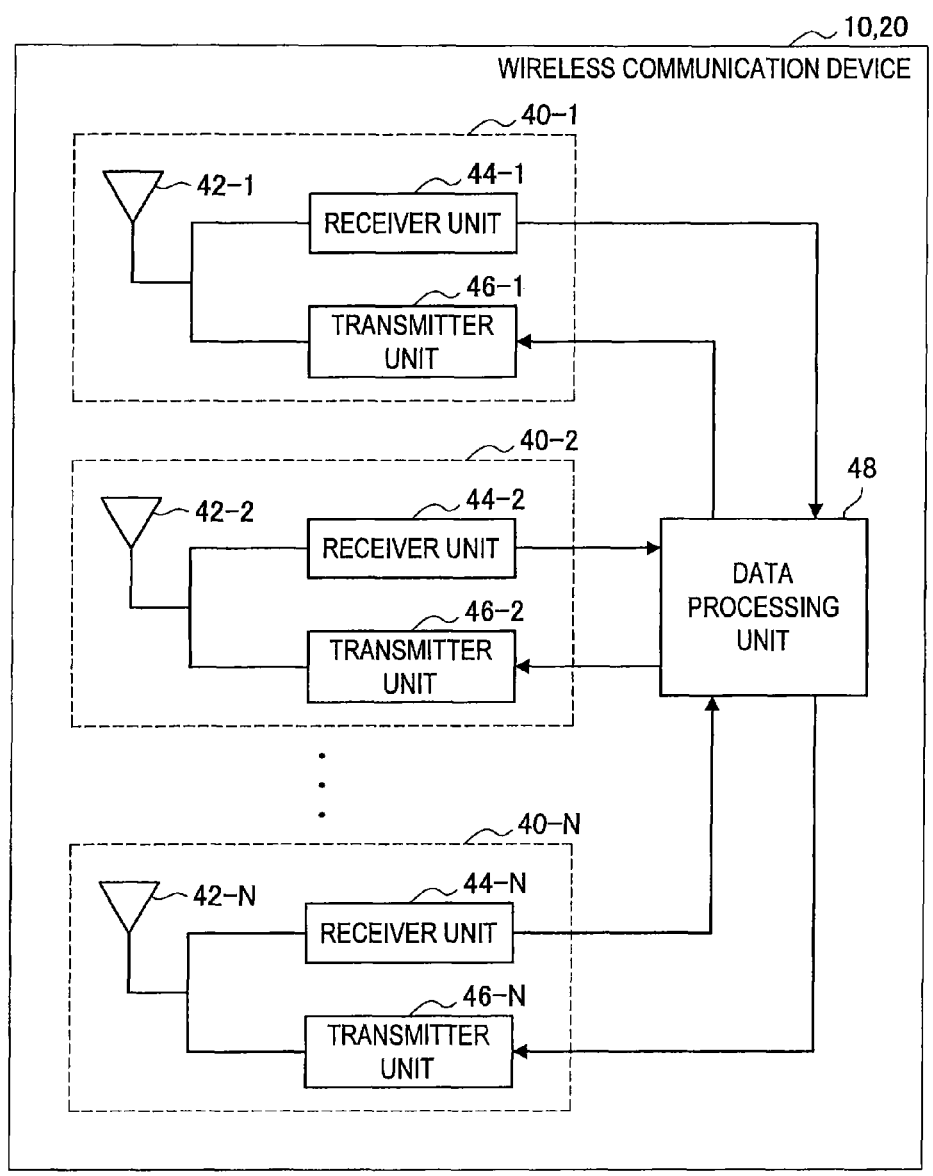
FIG. 4 is an explanatory diagram illustrating a structure of a wireless communication device, such as an access point or a station, according to an embodiment of the present invention.

FIG. 4 is an explanatory diagram illustrating a structure of a wireless communication device, such as the access point 10 or the station 20, according to an embodiment of the present invention. As shown in FIG. 4, the wireless communication device includes N sets of branches 40-1~40-N and a data processing unit 48. Each of the branches 40 includes an antenna element 42, a receiver unit 44, and a transmitter unit 46.

That is, the wireless communication device includes N antenna elements 42-1~42-N and may function the N antenna elements 42-1~42-N as adaptive array antennas by multiplying communication packets by each of the antenna elements 42 by appropriate weights. The wireless communication device operating as the access point 10 may increase the number of stations which can establish a simultaneous communication by SDMA by including more antenna elements 42.

The data processing unit 48 generates transmission packets and distributes the transmission packets to the branches 42-1~42-N in response to the transmission request of an upper-layer application. More specifically, the data processing unit 48 of the wireless communication device operating as the access point 10 generates transmission packets for each of the stations 20 and multiplies each of the transmission packets by a transmission weight for an adaptive array antenna of each of the branches 42. The data processing unit 48 supplies the transmission packets, which have been spatially separated for each destination due to the multiplication, to the branches 42-1~42-N as digital baseband signals.

The data processing unit 48 may learn a weight for an adaptive array antenna by applying an adaptive algorithm, such as RLS (Recursive Least Square), to a training field which is a known sequence received from a destination device.

If the digital baseband signal is supplied from the data processing unit 25, each of the transmitter units 46-1~46-N performs signal processing, such as encoding or modulating, on the digital baseband signal. Further, each of the transmitter units 46-1~46-N performs D/A conversion and upconversion of the digital baseband signal and supplies an analog high-frequency signal to the antenna elements 42-1~42-N. The antenna elements 42-1~42-N transmit the high-frequency signal, which is supplied from the transmitter units 46-1~46-N, as a wireless signal.

If the high-frequency signal received by the antenna elements 42-1~42-N is supplied, each of the receiver units 44-1~44-N performs downconversion and A/D conversion of the high-frequency signal. Further, each of the receiver units 44-1~44-N performs signal processing, such as demodulation or combining, on the baseband signal which has been subjected to the A/D conversion, and supplies the signal-processed baseband signal to the data processing unit 48.

The data processing unit 48 multiplies the baseband signal supplied from the receiver units 44-1~44-N by a reception weight for an adaptive array antenna. The data processing unit 48 supplies a transmission packet allocated for its own device among the transmission packets, which have been spatially separated by the multiplication, to an upper-layer application. If the wireless communication device employs a MIMO technique, the spatial separation may include separation of spatially multiplexed MIMO channels in addition to separation of transmission packets for each destination.

The data processing unit 48 performs processing of communication protocol on a MAC (Media Access Control) layer when communication by the branches 40-1~40-N is performed. Specifically, the data processing unit 48 performs access control by performing generation of packets for RTS/CTS handshake (e.g., multi-RTS, CTS, etc. which will be described), transmission instruction or the like. The access control according to an embodiment of the present invention using the RTS/CTS handshake will be described.

3. METHOD OF ACCESS CONTROL

Figure 5:
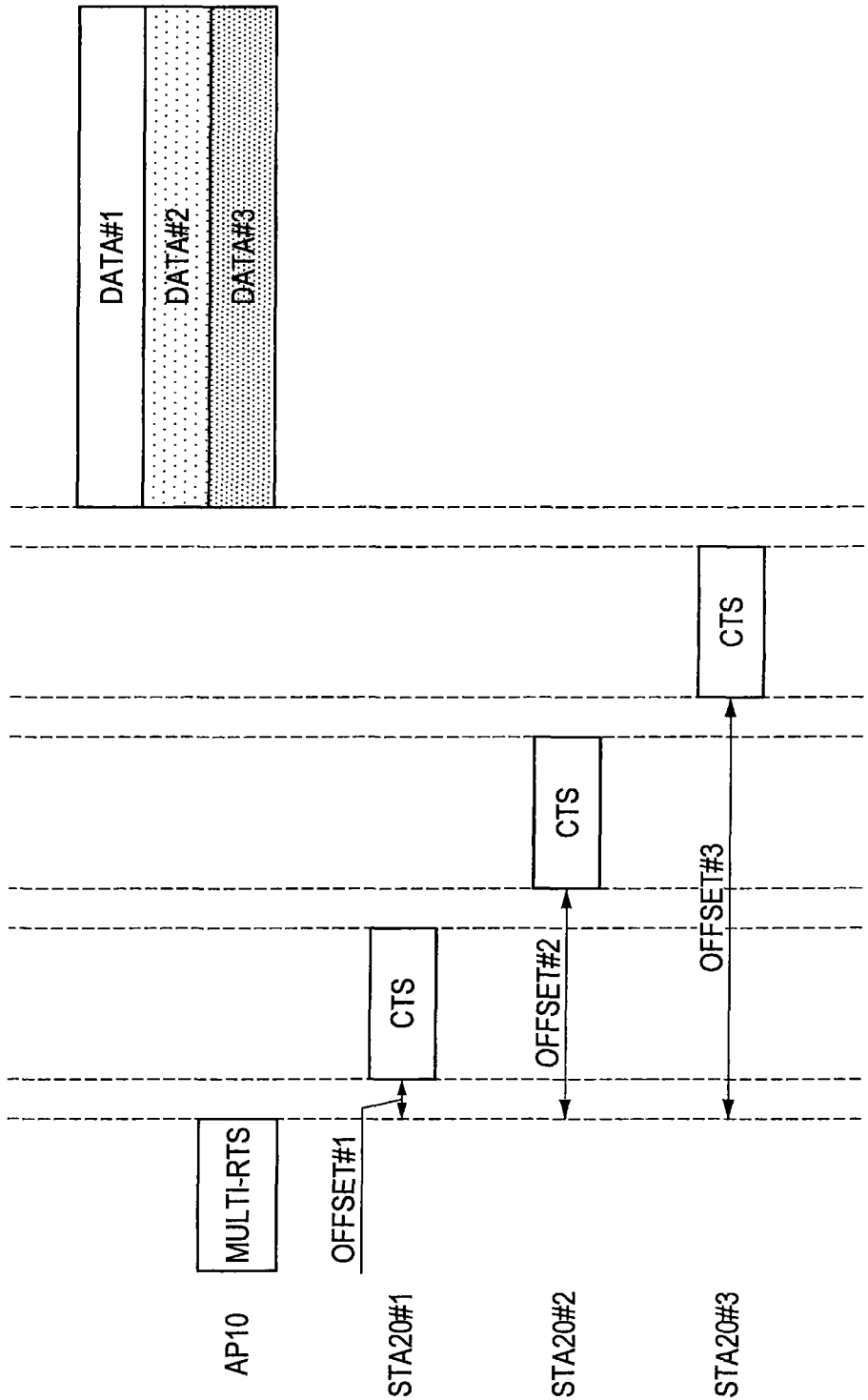
FIG. 5 is an explanatory diagram illustrating access control according to an embodiment of the present invention.

FIG. 5 is an explanatory diagram illustrating access control according to an embodiment of the present invention. As shown in FIG. 5, the access point 10, which wishes to transmit data to the stations 20#1~20#3, transmits a multi-RTS packet as a transmission request packet.

Figure 6:
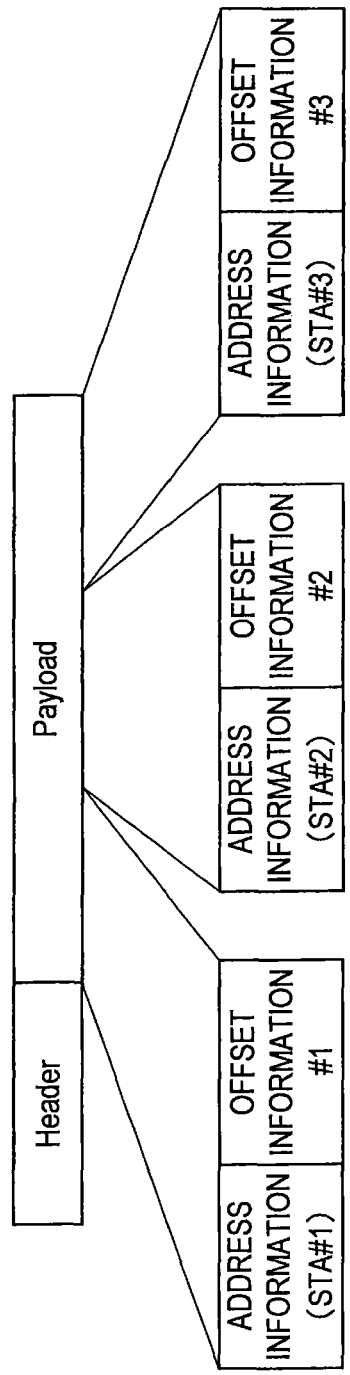
FIG. 6 is an explanatory diagram illustrating a structure of a multi-RTS packet.

FIG. 6 is an explanatory diagram illustrating a structure of a multi-RTS packet. As shown in FIG. 6, the multi-RTS packet includes a header and a payload. The payload includes address information of the stations 20#1~20#3 and offset information for each of the stations 20#1~20#3.

The offset information refers to response timing information which designates the transmission timing of a CTS packet from the station 20. More specifically, the offset information may be information indicating the elapsed time from the completion of reception of an RTS packet, information indicating the time to transmit a CTS packet, or information indicating the order.

The stations 20#1~#3 having received the multi-RTS packet check offset information which corresponds to address information of its own device with respect to the multi-RTS packet. As shown in FIG. 5, the data processing unit 48 of the stations 20#1~#3 transmits the same CTS packet (response packet) from each of the branches 40 at the transmission timings which are designated by the offset information.

Specifically, the station 20#1 checks the offset information #1 which corresponds to the address information of the station 20#1 with respect to the multi-RTS packet and initiates transmission of the CTS packet after the elapse of the offset #1, which is indicated by the offset information #1, from the completion of reception of the multi-RTS packet. Likewise, the station 20#2 initiates transmission of the CTS packet after the elapse of the offset #2, which is indicated by the offset information #2, from the completion of reception of the multi-RTS packet. Likewise, the station 20#3 initiates transmission of the CTS packet after the elapse of the offset #3, which is indicated by the offset information #3, from the completion of reception of the multi-RTS packet.

As such, the data processing unit 48 of the access point 10 sets the offset information such that the transmission timings of the CTS packets from the stations 20#1~#3 do not overlap each other on the time axis. More specifically, the data processing unit 48 may set the offset information such that the transmission timings of the CTS packets do not overlap each other on the time axis even in the case of a maximum error of SIFS by taking into account an allowable error of SIFS (+−10%) in IEEE 802.11.

By means of such a structure, the data processing unit 48 of the access point 10 may determine a transmission source station of a CTS packet based on the offset information set for each of the stations 20 and the reception timing of the CTS packet. For example, the data processing unit 48 of the access point 10 may determine a station 20, which has offset information set to correspond to the reception timing of a CTS packet, as a transmission source station of the CTS packet.

On the other hand, the neighboring wireless device 30#4 shown in FIG. 1 is located within the radio wave coverage of the stations 20#1 and #3. However, since the neighboring wireless device 30#4 may receive CTS packets from the stations 20#1 and #3 at the non-overlapped timings on the time axis, the neighboring wireless device 30#4 normally decode each of the CTS packets and set NAV. In other words, according to the embodiment of the present invention, it is possible to more appropriately prevent interference by the neighboring wireless devices 30 which are located around the communication group.

Next, the access point 10 transmits the data packets to the transmission source stations 20 of the CTS packets. For example, as shown in FIG. 5, if the access point 10 receives the CTS packets from the stations 20#1~#3, the access point 10 spatially multiplexes the data packets (DATA#1~DATA#3) by SDMA and transmits the spatially multiplexed data packets to each of the stations 20#1~#3.

Figure 7:
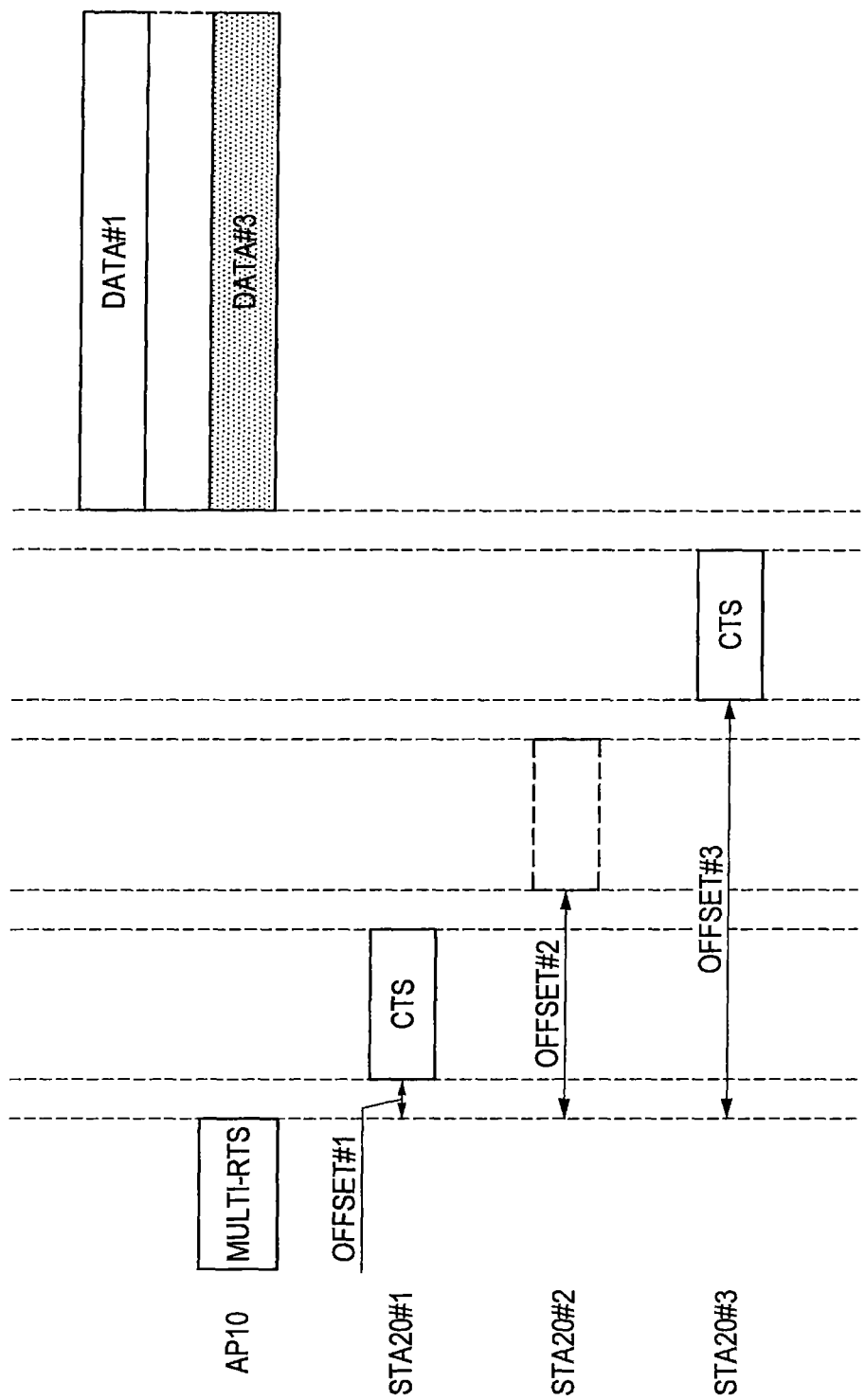
FIG. 7 is an explanatory diagram illustrating access control according to an embodiment of the present invention.

On the other hand, as shown in FIG. 7, if the access point 10 does not receive a CTS packet at the timing when the station 20#2 is instructed to transmit the CTS packet with respect to the multi-RTS packet, the access point 10 does not transmit the data packet (DATA#2) which is destined for the station 20#2. In this case, the access point 10 may use an antenna resource, which is expected to be used for the packet transmission to the station 20#2, for the packet transmission to another station, thereby improving the transmission rate for the other station.

Figure 8:
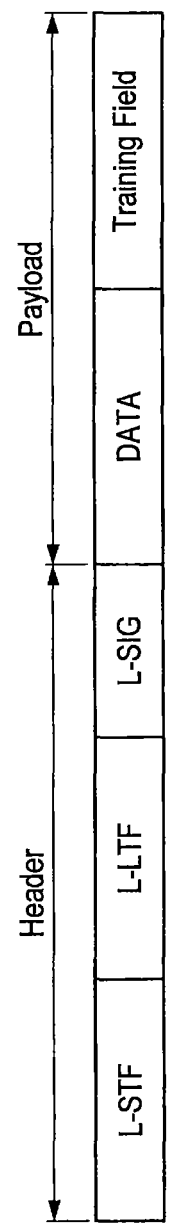
FIG. 8 is an explanatory diagram illustrating a structure of a CTS packet.

Further, in the embodiment of the present invention, since the access point 10 does not have to use content of the received signal to determine the transmission source station, each of the stations 20 may transmit the same CTS packet. As shown in FIG. 8, a training field for learning a weight for an adaptive array antenna may be incorporated in a CTS packet. Also in this case, however, each of the stations 20 may use the same training field, thus facilitating mounting.

The offset information setting of the data processing unit 48 is not limited to a specific method. For example, the data processing unit 48 may randomly set the offset information with respect to each of the stations 20. Alternatively, as described below, the data processing unit 48 may set the offset information based on a predetermined criterion with respect to each of the stations 20.

For a station 20 having a later transmission order of a CTS packet, the access point 10 initiates the transmission of data packets at a shorter interval from the reception of the CTS packet. On this account, if a training field is contained in the CTS packet, for a station 20 having a later transmission order of a CTS packet, the access point 10 may transmit data packets using a new weight which is obtained based on the training field.

Accordingly, the data processing unit 48 of the access point 10 may set the offset information such that the transmission timing of a CTS packet from a station 20 which is large in motion is delayed. Alternatively, the data processing unit 48 of the access point 10 may set the offset information such that the transmission timing of a CTS packet from a station which is a transmission destination of data packets at a high transmission rate is delayed.

Figure 9:
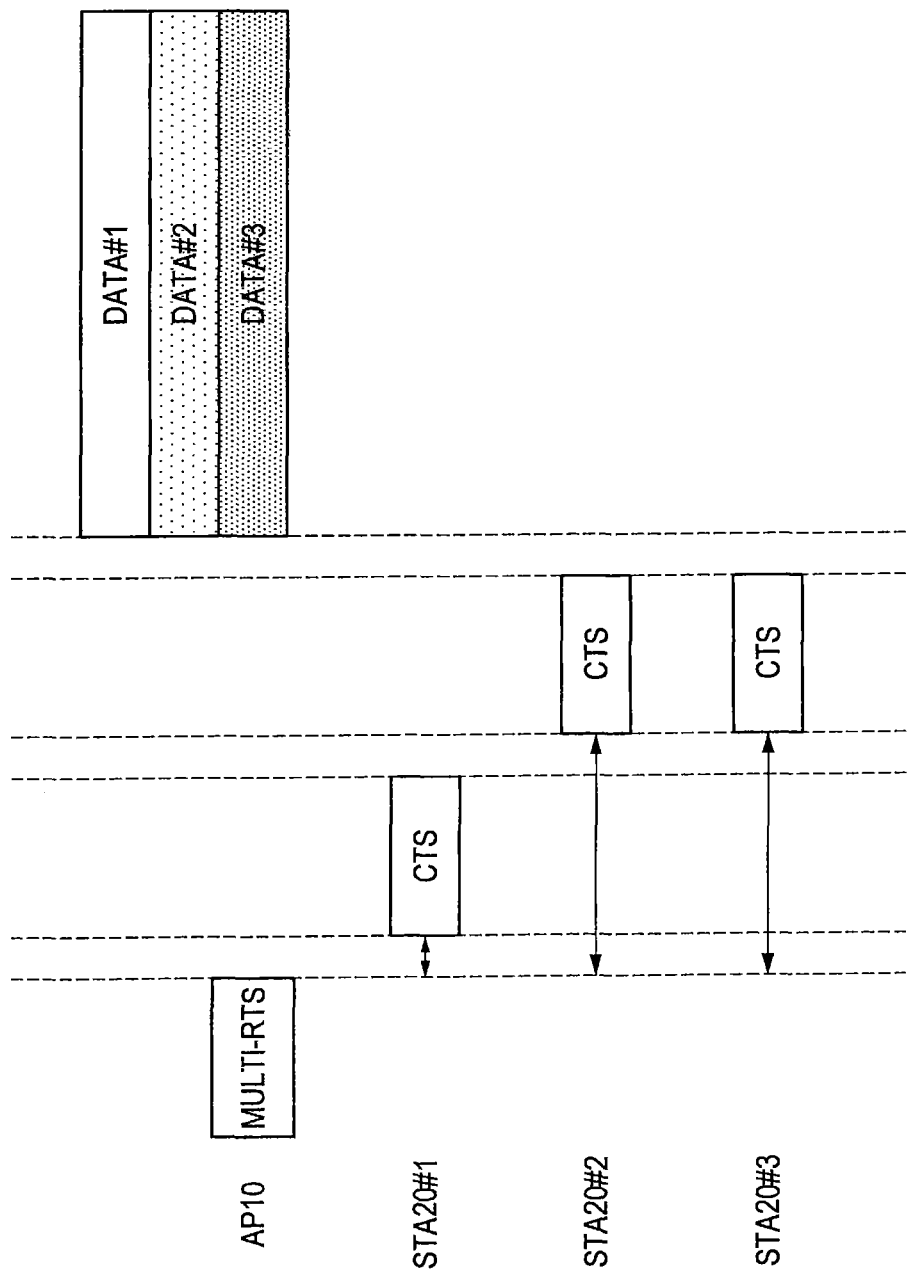
FIG. 9 is an explanatory diagram illustrating a modified example of an embodiment of the present invention.

However, setting the offset information in such a manner that the transmission timings of the CTS packets do not overlap each other on the time axis as described above will cause an increased overhead. In this case, as shown in FIG. 9, the data processing unit 48 of the access point 10 may set the offset information such that the transmission timings of some of the CTS packets are identical to each other.

For example, if a distance between the station #2 and the station #3 is large, it is relatively easy to separate signals received from the stations #2 and #3 by a MIMO technique. In this case, the transmission timings of CTS packets of some of the stations 20 may be identical to each other under a predetermined condition, such as when each of the stations 20 transmits an orthogonal signal or each of the stations 20 may limit a SIFS error to a predetermined range.

4. OPERATION OF WIRELESS COMMUNICATION DEVICE

In the foregoing, the access control according to the embodiment of the present invention has been described. Subsequently, the operations of the access point 10 and the station 20 according to an embodiment of the present invention will be described.

(Operation of Access Point)

Figure 10:
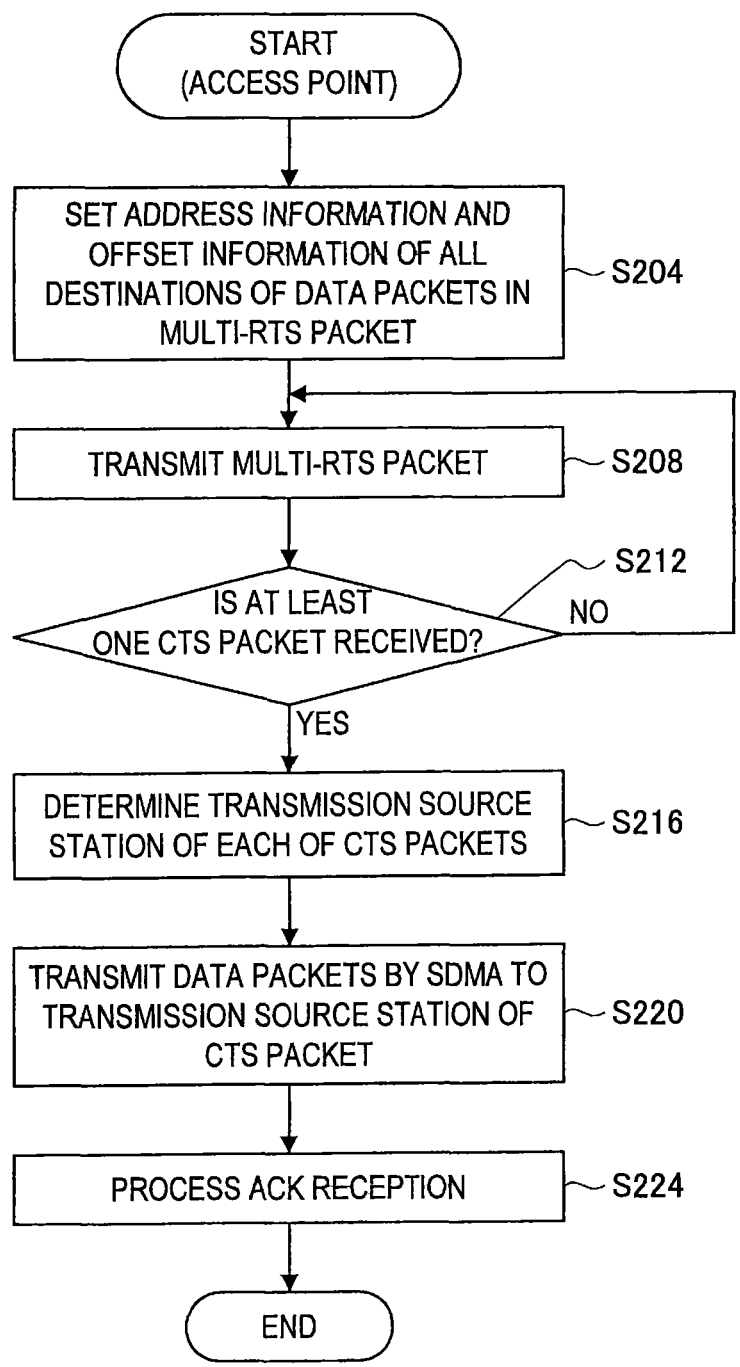
FIG. 10 is a flow chart illustrating the operation of an access point according to an embodiment of the present invention.

FIG. 10 is a flow chart illustrating the operation of the access point 10 according to an embodiment of the present invention. As shown in FIG. 10, the data processing unit 48 of the access point 10 sets address information and offset information of all destinations of data packets in the multi-RTS packet (S204). The branches 40 of the access point 10 transmit the multi-RTS packet generated by the data processing unit 48 (S208).

Next, if at least one CTS packet is received by the branches 40 of the access point 10 (S212), the data processing unit 48 determines a transmission source station of each of the CTS packets received by the branches 40 (S216).

Since the offset information designating the transmission timings of the CTS packets is set in the multi-RTS packet, each of the stations 20 transmits the CTS packet according to its corresponding offset information. Further, the offset information is set such that the transmission timings of the CTS packets by each of the stations are dispersed in a temporal manner. On this account, the data processing unit 48 may determine a transmission source station of a CTS packet based on the offset information which is set for each of the stations 20, and the reception timing of the CTS packet.

Subsequently, the access point 10 spatially multiplexes the data packets by SDMA and transmits the spatially multiplexed data packets to the transmission source station of the CTS packet (S220). If the access point 10 receives ACK from each of the stations 20, the access point 10 terminates a series of transmission sequences (S224).

(Operation of Station)

FIG. 11 is a flow chart illustrating the operation of the station 20 according to an embodiment of the present invention. As shown in FIG. 11, if a packet is received by the branch of the station 20, the data processing unit 48 of the station 20 determines whether or not the received packet is a multi-RTS packet (S304).

Further, if the received packet is a multi-RTS packet and the multi-RTS packet includes address information of the station 20 (S308), the data processing unit 48 of the station 20 extracts offset information corresponding to the address information of the station 20. The data processing unit 48 of the station 20 counts down an offset value indicated by the offset information (S312).

If the countdown of the offset value by the data processing unit 48 of the station 20 is completed, the branch 40 of the station 20 transmits a CTS packet to the access point 10. Specifically, if the multi-RTS packet includes a training request (S316), the branch 40 of the station 20 transmits a CTS packet containing a training field as shown in FIG. 8 (S320).

If the multi-RTS packet includes no training request (S316), the branch 40 of the station 20 transmits a general CTS packet containing no training field (S320). The station 20 performs a data packet reception process including an ACK response (S328) and terminates a series of reception sequences.

If the station 20 receives a packet other than the multi-RTS packet, the station 20 performs a process corresponding to the received packet (S304). If the received multi-RTS packet does not contain address information of its own device, the station 20 sets NAV (Network Allocation Vector) based on duration information included in the multi-RTS packet (S308).

5. CONCLUSION

As described above, according to the embodiments of the present invention, it is possible to disperse transmission of CTS packets by each of the stations 20 in a temporal manner by setting the offset information for each of the stations 20 in the multi-RTS packet. Accordingly, the access point 10 may easily determine a transmission source of a CTS packet based on the reception timing of the CTS packet.

Further, since the neighboring wireless device 30 may also receive CTS packets at the timings other than the same timing, the neighboring wireless device 30 may normally decode each of the CTS packets and set NAV. In other words, it is possible to more appropriately prevent interference caused by the neighboring wireless device 30 which is located around the communication group.

Further, according to the embodiment of the present invention, since the IEEE 802.11 standard states that an allowable error of SIFS by the station 20 is about +−10%, the embodiment of the present invention is effective in terms of easy mounting.

The preferred embodiments of the present invention have been described above with reference to the accompanying drawings, whilst the present invention is not limited to the above examples. A person skilled in the art may find various alternations and modifications within the scope of the appended claims, and it should be understood that they will naturally come under the technical scope of the present invention.

For example, it should be noted that in the present invention, the steps of the operations of the access point 10 and the station 20 are not necessarily performed in time series in the order described in the flow chart. For example, the steps of the operations of the access point 10 and the station 20 may be processed in a different order from the order described in the flow chart or in a parallel manner.

In addition, it is possible to make a computer program configured for hardware, such as CPU, ROM and RAM, which is incorporated in the access point 10 and the station 20, to execute the same function as that of each of elements of the access point 10 and the station 20. Further, a storage medium for storing the computer program is also provided.

REFERENCE SIGNS LIST

10 Access point
20 Station
40, 40-1, 40-2, 40-N Branch
42, 42-1, 42-2, 42-N Antenna element
44, 44-1, 44-2, 44-N Receiver unit
46, 46-1, 46-2, 46-N Transmitter unit
48 Data processing unit

The invention claimed is:
1. A wireless communication device comprising:
circuitry configured to:
generate an RTS (Request To Send) packet including response timing information designating transmission timings of CTS (Clear To Send) packets from each of a plurality of wireless communication devices;
transmit the RTS packet generated by the circuitry to the each of the plurality of wireless communication devices, and transmit a data packet to the each of the plurality of wireless communication devices based on the CTS packets transmitted from the each of the plurality of wireless communication devices, wherein the circuitry is configured to determine the transmission timing for the each of the plurality of wireless communication devices designated by the response timing information based on each amount of motion of the each of the plurality of wireless communication device.

2. The wireless communication device according to claim 1, wherein the circuitry sets the timing information in such a manner that transmission timings of the CTS packets from each of the plurality of wireless communication devices do not overlap each other.

3. The wireless communication device according to claim 2, wherein the circuitry sets the response timing information in such a manner that CTS packets transmitted from each of the plurality of wireless communication devices do not overlap each other on a time axis.

4. The wireless communication device according to claim 3,
wherein the circuitry is configured to receive a CTS packet with respect to the RTS packet,
wherein the circuitry determines a transmission source device of the CTS packet based on a reception timing of the CTS packet by the circuitry, and
wherein the circuitry transmits a data packet to the transmission source device of the CTS packet which is determined by the circuitry.

5. The wireless communication device according to claim 4, wherein the circuitry transmits the data packet by SDMA (Space Division Multiple Access).

6. The wireless communication device according to claim 1, wherein the circuitry is configured to determine the transmission timing for the each of the plurality of wireless communication devices such that the transmission timing of the CTS packets from the wireless communication device which is larger in motion is delayed more.

7. The wireless communication device according to claim 1, wherein the CTS packet includes a training field.

8. A wireless communication system comprising:
a plurality of first wireless communication devices; and
a second wireless communication device including:
circuitry configured to:
generate an RTS (Request To Send) packet including response timing information designating transmission timings of CTS (Clear To Send) packets from each of the plurality of first wireless communication devices;
transmit the RTS packet generated by the circuitry to the each of the plurality of first wireless communication devices, and
transmit a data packet to the each of the plurality of first wireless communication devices based on the CTS packets transmitted from the each of the plurality of first wireless communication devices, wherein
each of the plurality of first wireless communication devices transmits the CTS packets to the second wireless communication device at transmission timings designated by the response timing information, and
the circuitry is configured to determine the transmission timing for the each of the plurality of first wireless communication devices designated by the response timing information based on each amount of motion of the each of the plurality of first wireless communication device.

9. The wireless communication system according to claim 8, wherein the CTS packets transmitted from each of the plurality of first wireless communication devices are of same data.

10. A wireless communication method comprising:
generating, by circuitry, an RTS (Request To Send) packet including each response timing information designating transmission timings of CTS (Clear To Send) packets from each of a plurality of wireless communication devices;
transmitting, by the circuitry, the RTS packet to the each of the plurality of wireless communication devices,
transmitting, by the circuitry, a data packet to the each of the plurality of wireless communication devices based on the CTS packets transmitted from the each of the plurality of wireless communication devices, and
determining, by the circuitry, the transmission timing for the each of the plurality of wireless communication devices designated by the response timing information based on each amount of motion of the each of the plurality of wireless communication device.

* * * * *